(12) United States Patent
Perreault et al.

(10) Patent No.: US 9,344,514 B2
(45) Date of Patent: May 17, 2016

(54) METHOD AND PROXY FOR TRANSPORTING IP PAYLOADS OVER A DELAY-TOLERANT NETWORK (DTN)

(75) Inventors: Simon Perreault, Quebec (CA);
Jean-Philippe Dionne, Quebec (CA);
Marc Blanchet, St-Augustin (CA)

(73) Assignee: VIAGENIE, Quebec (CA)

( * ) Notice: Subject to any disclaimer, the term of this patent is extended or adjusted under 35 U.S.C. 154(b) by 65 days.

(21) Appl. No.: 13/281,877

(22) Filed: Oct. 26, 2011

(65) Prior Publication Data
US 2013/0111053 A1    May 2, 2013

(51) Int. Cl.
| | | |
|---|---|---|
| G06F 15/16 | (2006.01) |
| H04L 29/08 | (2006.01) |
| H04L 29/06 | (2006.01) |
| H04L 12/801 | (2013.01) |

(52) U.S. Cl.
CPC ............ *H04L 67/2823* (2013.01); *H04L 69/16* (2013.01); *H04L 47/34* (2013.01); *H04L 67/02* (2013.01); *H04L 69/22* (2013.01)

(58) Field of Classification Search
CPC . H04L 43/0852; H04L 45/125; H04L 67/322; H04L 69/329; H04L 29/06; H04L 47/30; H04L 67/1002; H04L 67/1097; H04L 69/164; H04L 69/26; G06F 9/505
USPC .................................................. 709/230–235
See application file for complete search history.

(56) References Cited

U.S. PATENT DOCUMENTS

| | | | | |
|---|---|---|---|---|
| 6,289,461 | B1 * | 9/2001 | Dixon ..................... | H04L 47/30 709/230 |
| 8,001,261 | B2 * | 8/2011 | Katis ...................... | H04L 51/04 370/395.64 |
| 9,015,822 | B2 * | 4/2015 | Bathrick ................. | H04L 45/00 709/230 |
| 2001/0025318 | A1 * | 9/2001 | Higashiyama ........ | H04L 12/462 709/238 |
| 2002/0188749 | A1 * | 12/2002 | Gaur ..................... | G06F 13/128 709/234 |
| 2009/0103528 | A1 * | 4/2009 | Katis ...................... | H04L 51/04 370/356 |
| 2009/0196170 | A1 * | 8/2009 | Ayyagari ................ | H04L 45/02 370/221 |

OTHER PUBLICATIONS

Lori MacVittie, "What is server offload and why do I need it?", Jun. 17, 2009, from https://devcentral.f5.com/articles/what-is-server-offload-and-why-do-i-need-it#.UnWFvcX7Lcp.*
Cott K., "Disruption tolerant networking proxies for on-the-move tactical networks", Oct. 17-20, 2005, Military Communications Conference, 2005. MILCOM 2005. IEEE, ISBN: 0-7803-9393-7, p. 3226-3231 vol. 5.*
Scott ("Disruption tolerant networking proxies for on-the-move tactical networks", Military Communications Converence 2005. MILCOM 2005, IEEE ISBN:0-7803-9393-7. p. 3226-3231 vol. 5).*
RFC5050 ("Bundle Protocol Specificatoin", RFC5050, Nov. 2007, from https://tools.ietf.org/html/rfc5050).*

(Continued)

*Primary Examiner* — Edward Kim
(74) *Attorney, Agent, or Firm* — BCF LLP

(57) ABSTRACT

The present relates to a method and a proxy for transporting IP messages over a Default Tolerant Network. The method and proxy receive a message composed of multiple IP packets payload, and create partial messages by bundling sub-groups of subsequent IP packets payload with a unique identifier and a corresponding sequence number. The partial messages are transported over the DTN. The partial messages are received at another proxy after transport over the DTN, are unbundled and ordered based on the sequence number; and delivered.

8 Claims, 8 Drawing Sheets

(56) References Cited

OTHER PUBLICATIONS

Jörg Ott et al.; "Applying DTN to Mobile Internet Access: An Experiment with HTTP"; http://www.drive-thru-internet.org/; Jun. 12, 2005.

Aruna Balasubramanian et al.; "Web Search From a Bus"; Dept. of Computer Science, University of Massachusetts Amherst, Amherst, MA, USA.

Mikko Pitkänen et al.; "Opportunistic Web Access via WLAN Hotspots"; 2010.

Jörg Ott et al.; "Bundling the Web: HTTP over DTN"; 2006.

* cited by examiner

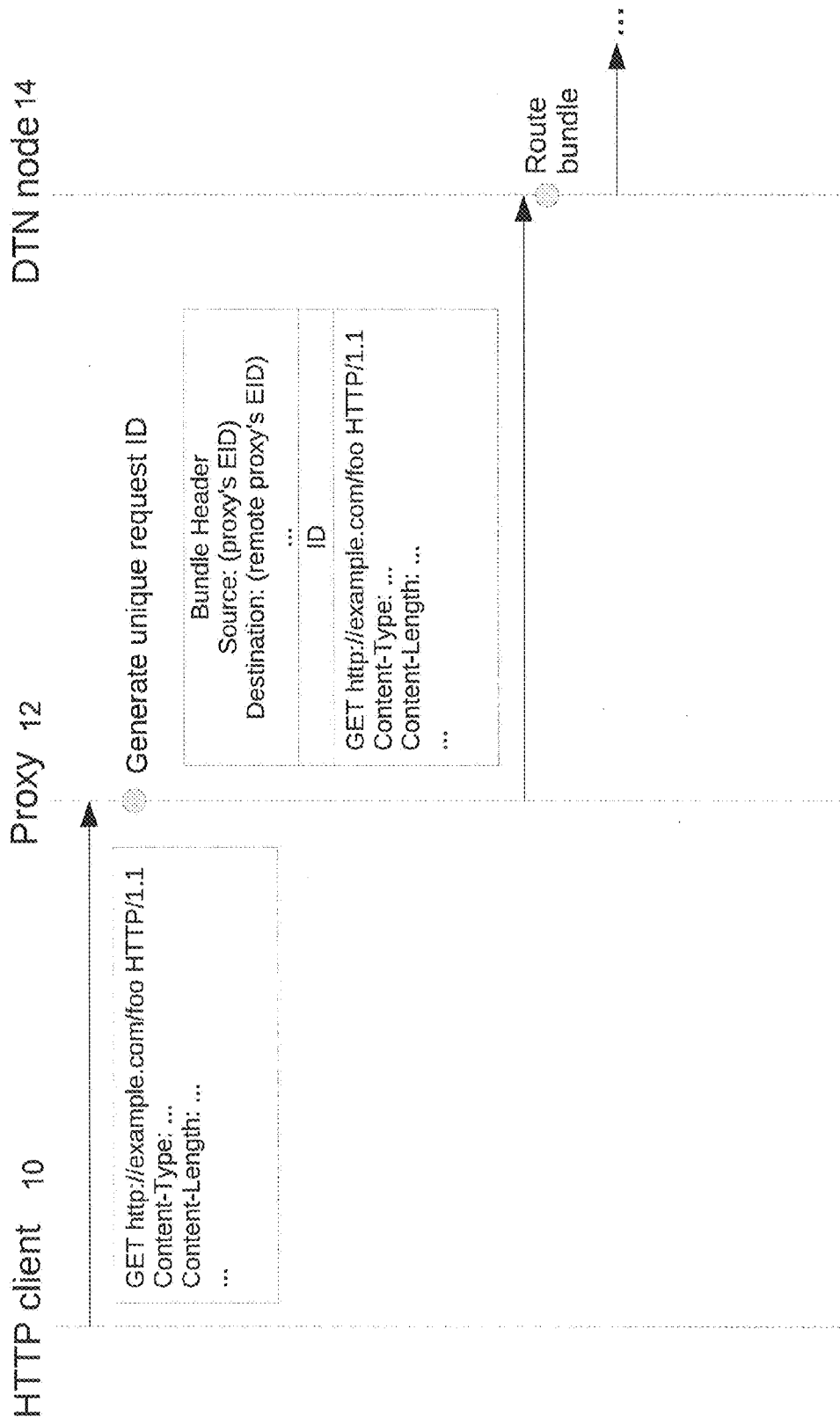

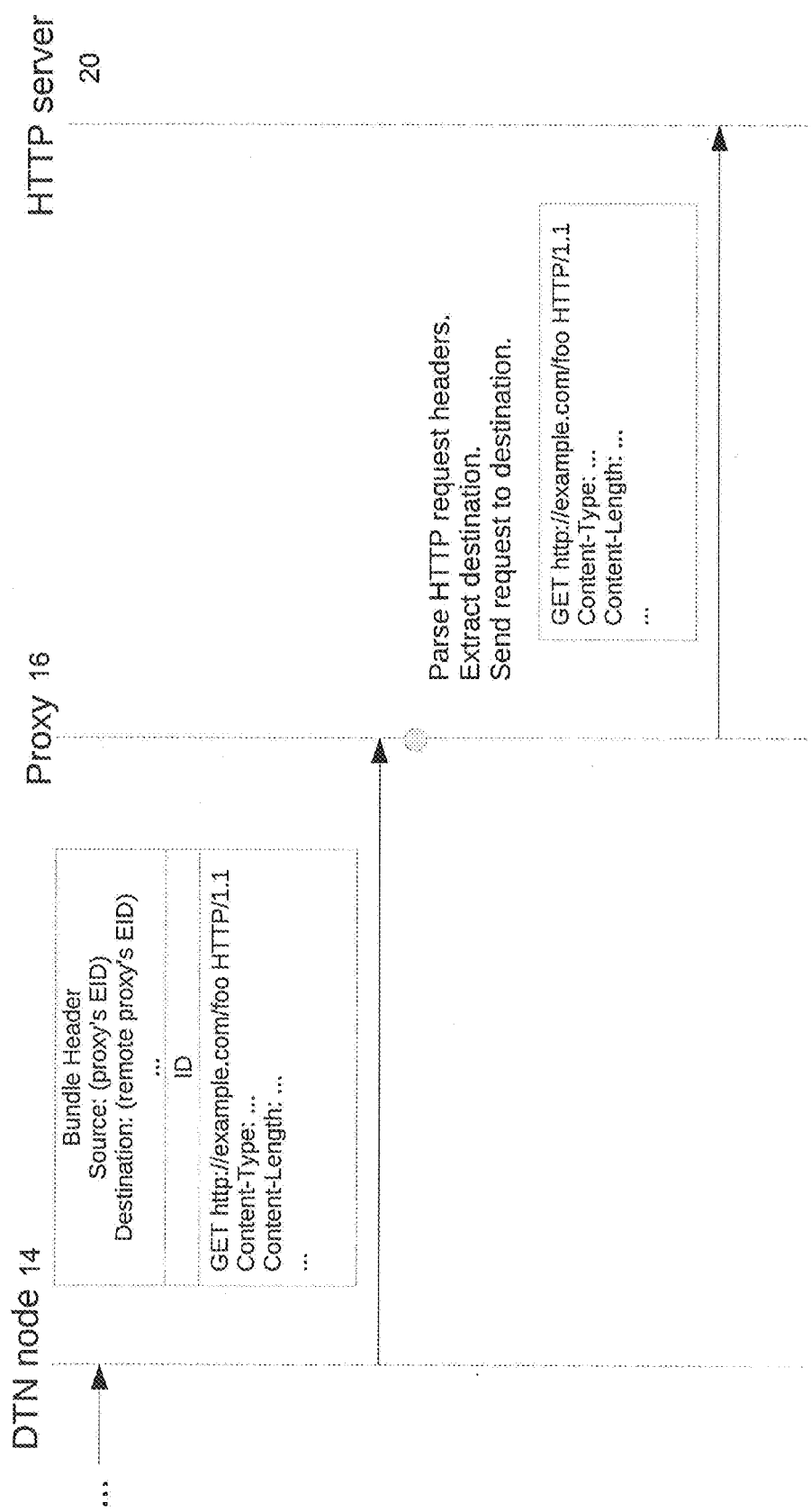

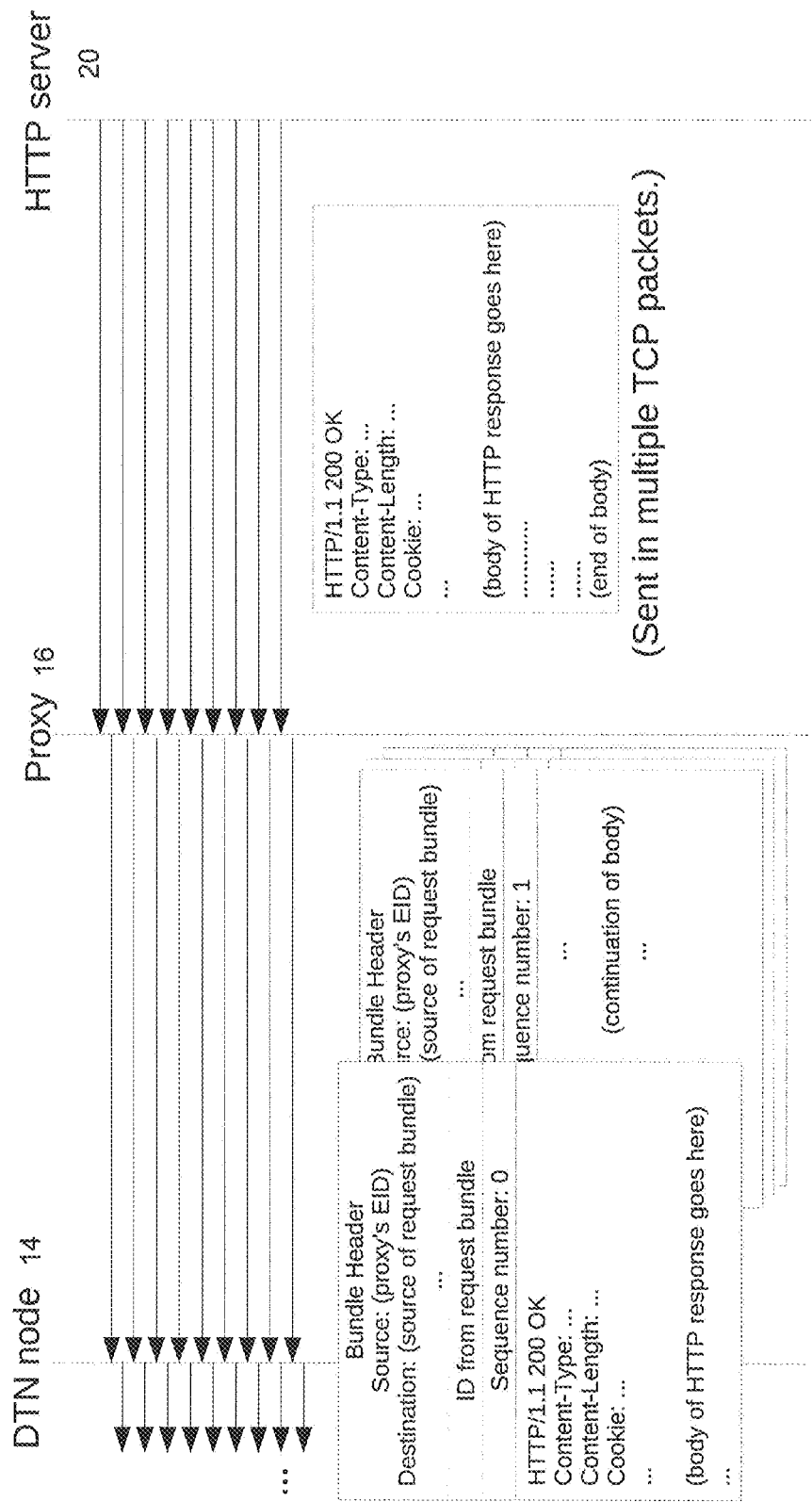

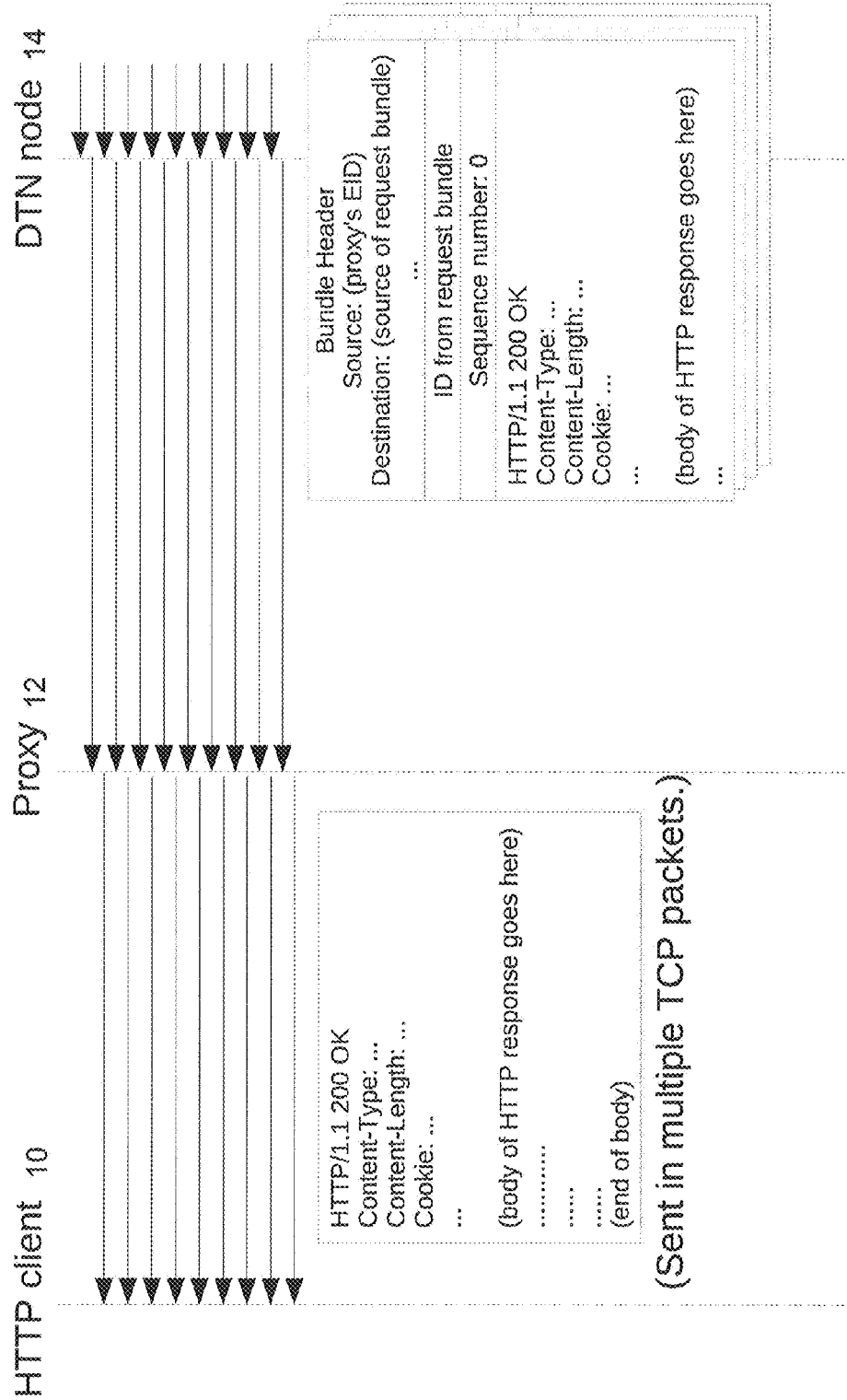

US 9,344,514 B2

METHOD AND PROXY FOR TRANSPORTING IP PAYLOADS OVER A DELAY-TOLERANT NETWORK (DTN)

FIELD

The present relates to Delay/Disruption Tolerant Networks (DTNs), and more particularly to a method and a proxy for improving delivery of payload over DTNs.

BACKGROUND

Delay/Disruption Tolerant Networks (DTN) rely on a store-and-forward protocol for transferring bundles of data. DTN protocols are designed for allowing communications in environments causing long delays, such as in space, for highly asymmetric communications, such as communicating with a robot on another planet, and as well for networks suffering from unstable connections.

The architecture and protocol of DTN are standardized, and information about those standards can be found in the Internet Engineering Task Force Official Documents.

An exemplary representation of a DTN network is provided in FIG. 1. More particularly, FIG. 1 schematically represents the transport of Hypertext Transport Protocol (HTTP) messages over a DTN network. The DTN network transports HTTP messages between a first HTTP client (left-hand side) and a HTTP server (right-hand side). When HTTP messages reach the DTN network from an Internet Protocol (IP) network, a proxy is used to modify the received HTTP messages to allow proper transport over the DTN network by adding a Bundle Protocol (BP) header as defined in the standard Internet Engineering Task Force Request for Comments (IETF RFC) 5050. The modified HTTP messages are then transported over the DTN network, hopping from node-to-node, until they reach the exit proxy, which removes the BP header from the received HTTP messages, and forwards the HTTP messages to the HTTP server over a regular IP network.

This method of transporting HTTP messages over a DTN network also allows carrying of other application-layer protocols such as Simple Mail Transfer Protocol (SMTP), Extensible Messaging and Presence Protocol (XMPP), and others. Furthermore, this approach provides several benefits, such as minimizing developer training, reusing existing development tools, reuse of existing frameworks, while being completely transparent to users.

However, current DTN architecture and standards do not provide a suitable means of transport of HTTP traffic requiring larger payload, streaming, and other such applications. There is thus a need to improve the current DTN architecture and protocol so as to better support a greater variety of HTTP traffic.

SUMMARY

The present provides a method for transporting IP payload over a Delay-Tolerant network (DTN). The method proceeds by receiving messages at a proxy, inserting within each message an identifier and a corresponding sequence number, transporting over the DTN the messages comprising the identifier and corresponding sequence number, receiving the messages comprising the identifier and corresponding sequence number transported over the DTN at an other proxy, and ordering the messages at the other proxy before delivering the messages.

For doing so, the present provides a proxy for transporting Hypertext Transport Protocol (HTTP) messages over a Delay-Tolerant network (DTN). The proxy comprises an input, a sequencing module and an output. The input receives messages to be transported on the DTN. The sequencing module inserts within received messages an identifier and a sequence number corresponding to an order of receipt of each message. The output transports the received messages with identifier and sequence number on the DTN.

In accordance with another aspect, the present relates to a proxy for delivering Hypertext Transport Protocol (HTTP) messages transported over a Delay-Tolerant network (DTN). The proxy comprises an input, a sequencing module, and an output. The input receives messages transported over the DTN. The sequencing module removes from received messages an identifier representative of a corresponding request, orders the received messages in accordance with a sequence number in each message, and removes the sequence number. The output delivers the received messages.

BRIEF DESCRIPTION OF THE DRAWINGS

In the following description, the following drawings are used to describe and exemplify the present method and proxy:

FIG. 5 is an exemplary signal flow of an HTTP request message transported from an HTTP client and onto a DTN network;

FIG. 6 is an exemplary signal flow of an HTTP request message transported onto the DTN network, received at a proxy and forwarded to an HTTP server;

FIG. 7 is an exemplary signal flow of HTTP responses received from the HTTP server at the proxy, and modified by the proxy in accordance with the present method, so as to allow proper transport over the DTN network in the form of a series of HTTP responses; and FIG. 8 is an exemplary signal flow of HTTP responses in accordance with the present method, transported over the DTN network, received at a proxy, modified by the proxy before being sent to the HTTP client.

DETAILED DESCRIPTION

Figure 1:
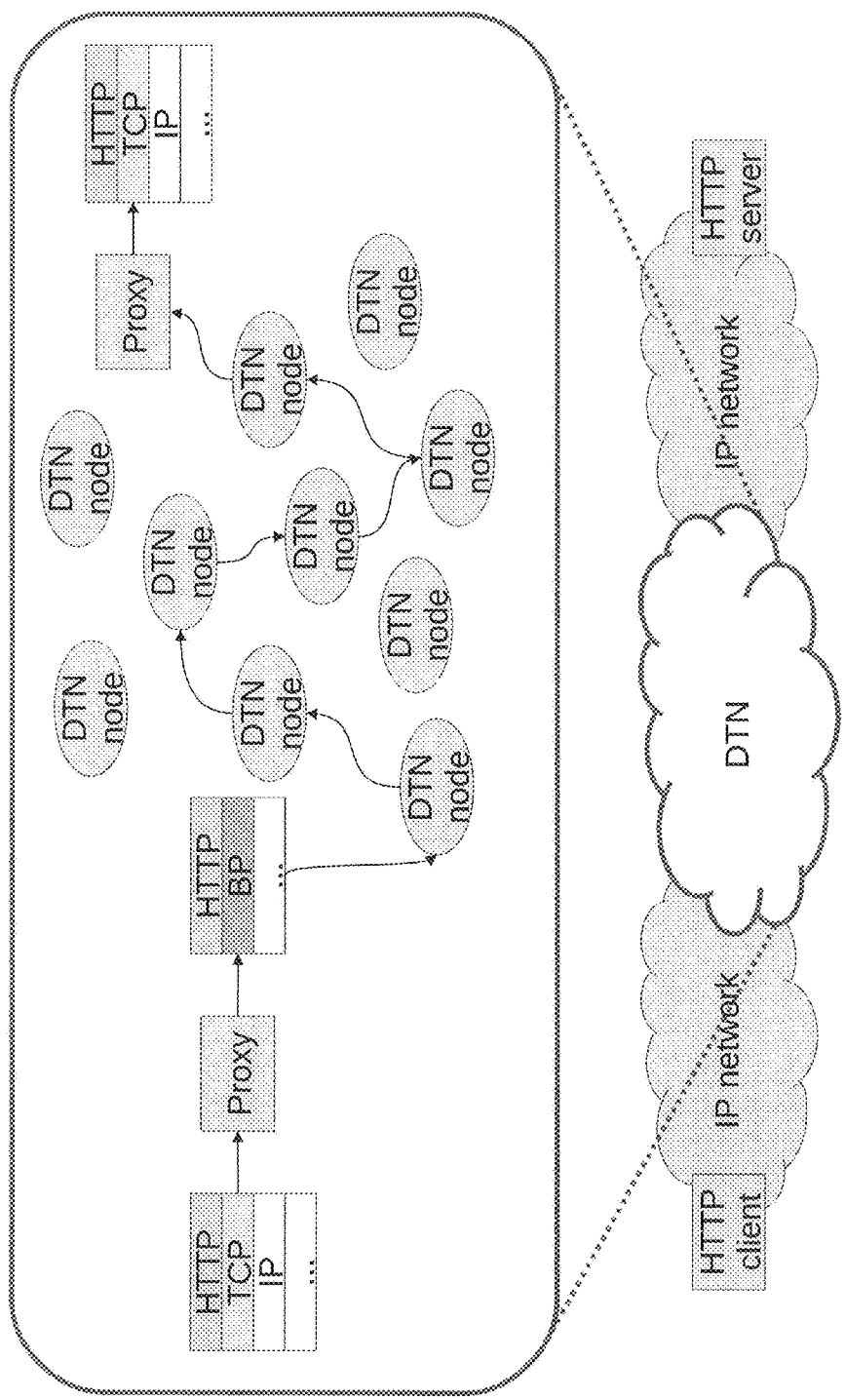
FIG. 1 is an exemplary representation of a DTN network.
Figure 2:
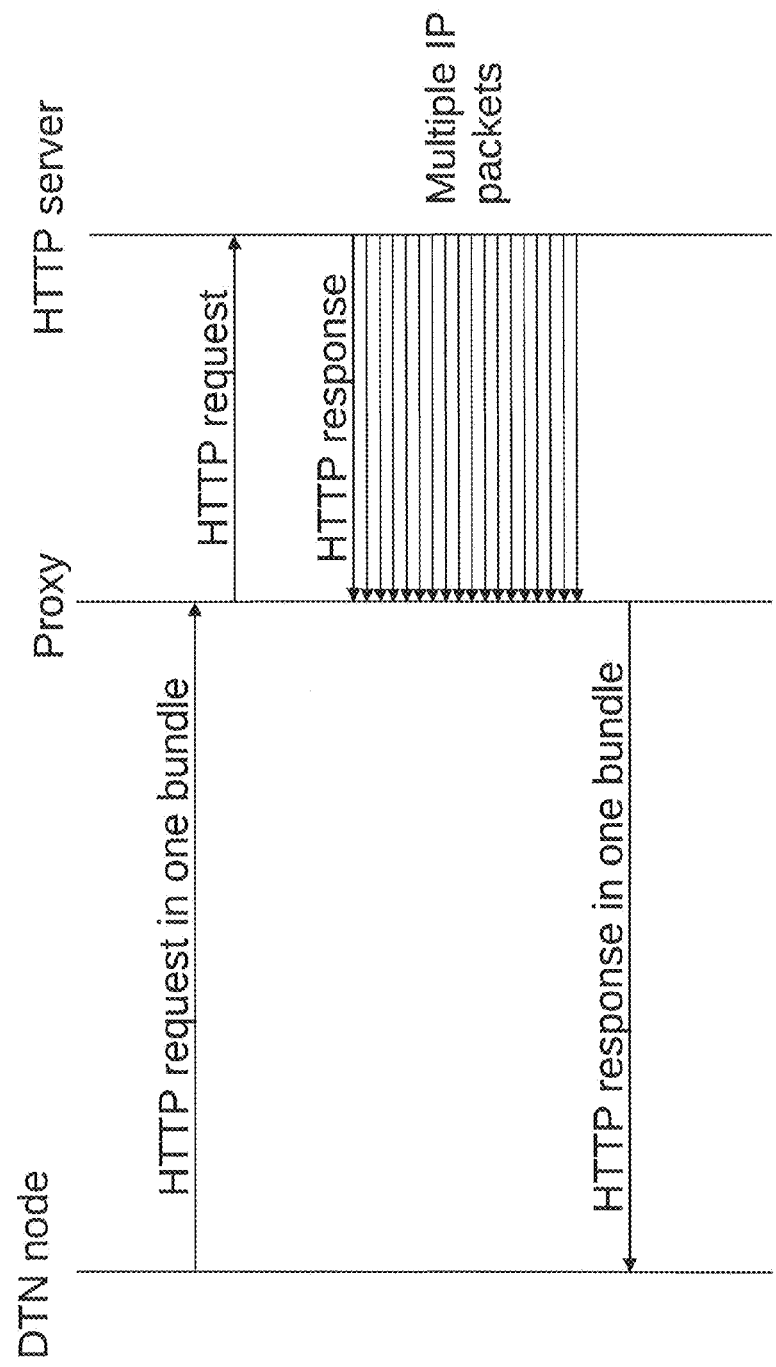
FIG. 2 is a prior art signal flow diagram for an HTTP request and its corresponding HTTP response.

Current DTN networks suffer from important limitations in their capacity to transport IP application protocols. Examples of such limitations are discussed with reference to FIG. 2, which represents a prior art signal flow diagram between a DTN node, a proxy, and an HTTP server. Typically, the DTN node forwards an HTTP request in the form of a bundle to the proxy. The HTTP request comprises payload, which indicates the information requested. The proxy receives the HTTP request, removes a Bundle Protocol header used to carry the HTTP request over the DTN network, and forwards the HTTP request to the HTTP server. The HTTP server receives the HTTP request, and proceeds with providing the requested information. The requested information consists of a single HTTP response message which may be transported in one or, more commonly and as shown on FIG. 2, multiple IP packets. The IP packets transporting the HTTP response are sent to the proxy, which, in prior art networks, bundles all received IP packet payloads into a single HTTP response sent to the DTN node and transported over the DTN network.

However, this approach of bundling the IP packet payloads corresponding to the HTTP response received by the HTTP server at the proxy has many drawbacks. One such drawback is that the proxy must buffer all IP packet payloads corresponding to the HTTP response before sending it on the DTN network. Buffering all IP packet payloads corresponding to the HTTP response causes high latency, and requires a lot of storage at the proxy. Another drawback is that intermediate DTN nodes within the DTN network may not be capable of receiving and forwarding large Bundle Protocol (BP) messages. Yet another drawback is that some type of information carried in HTTP responses is infinite, such as for example the information corresponding to a web cam. Also, this method of communicating over DTN networks does not allow HTTP streaming of any media, where the destination cannot receive and see the data as it served from the origin, but has to wait that the source had sent all data before the destination will start receiving the first part of the data.

Figure 3:
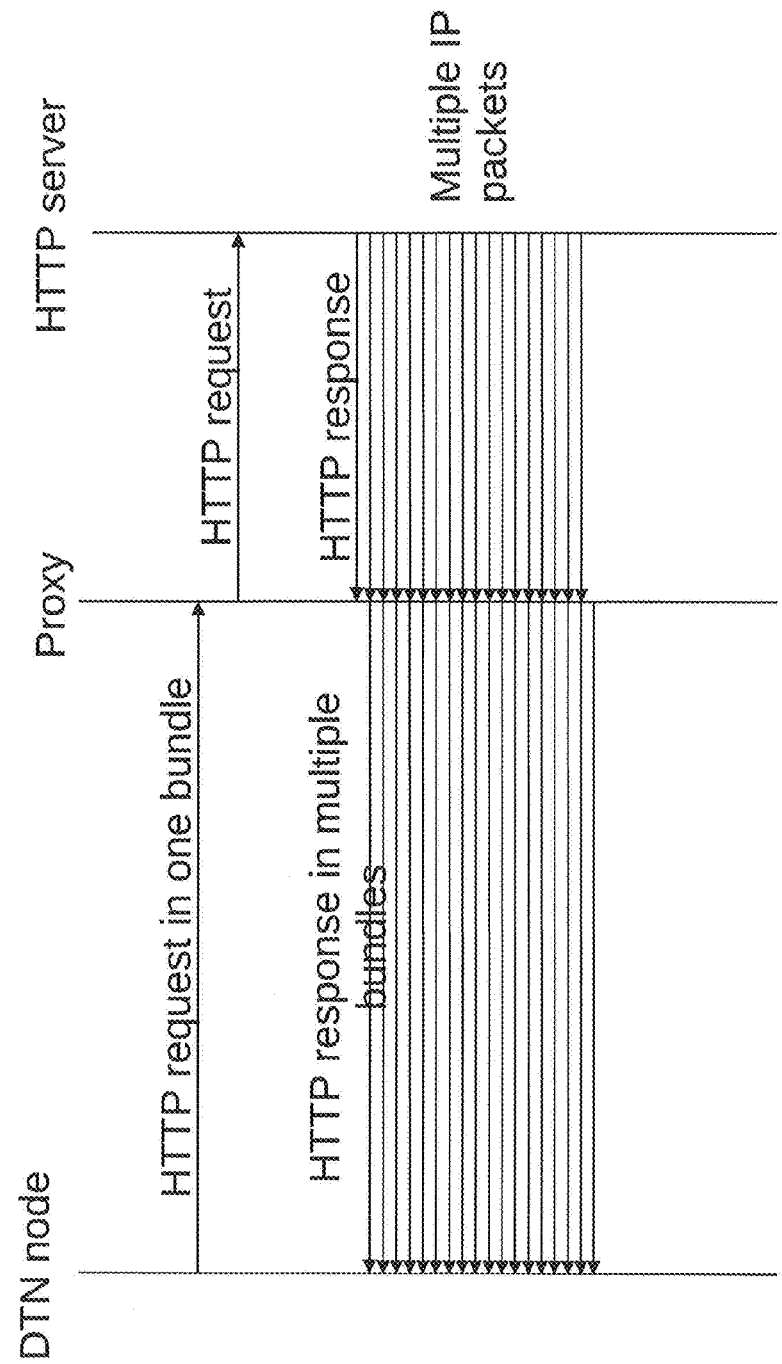
FIG. 3 is a signal flow diagram in accordance with the present method and proxy for transporting HTTP response messages over the DTN network.

To overcome these drawbacks, the present method and proxy provide means for transporting messages, such as HTTP messages in multiple bundles instead of a single bundle over a DTN network. Reference is now made to FIG. 3, which is a high-level signal flow diagram in accordance with the present method and proxy. Although FIGS. 3-8 depict messages and nodes corresponding to HyperText Transfer Protocol (HTTP), the present method and proxy are not limited to such a protocol, and could equally apply to any protocol that operates in a response-request manner, such as HTTP, SMTP, XMPP or else.

The present method and proxy thus receive an HTTP message composed of multiple IP packets payload, and instead of waiting for all IP packets payload to be received and bundled into one single HTTP message, the present method and proxy add sequence numbers to the IP packets payload so as to transport the IP packets payload bundled separately or bundled in sub-groups on a DTN network. Throughout the present specification, the expression HTTP message is used and is meant to equally refer to HTTP request and HTTP response.

Figure 4:
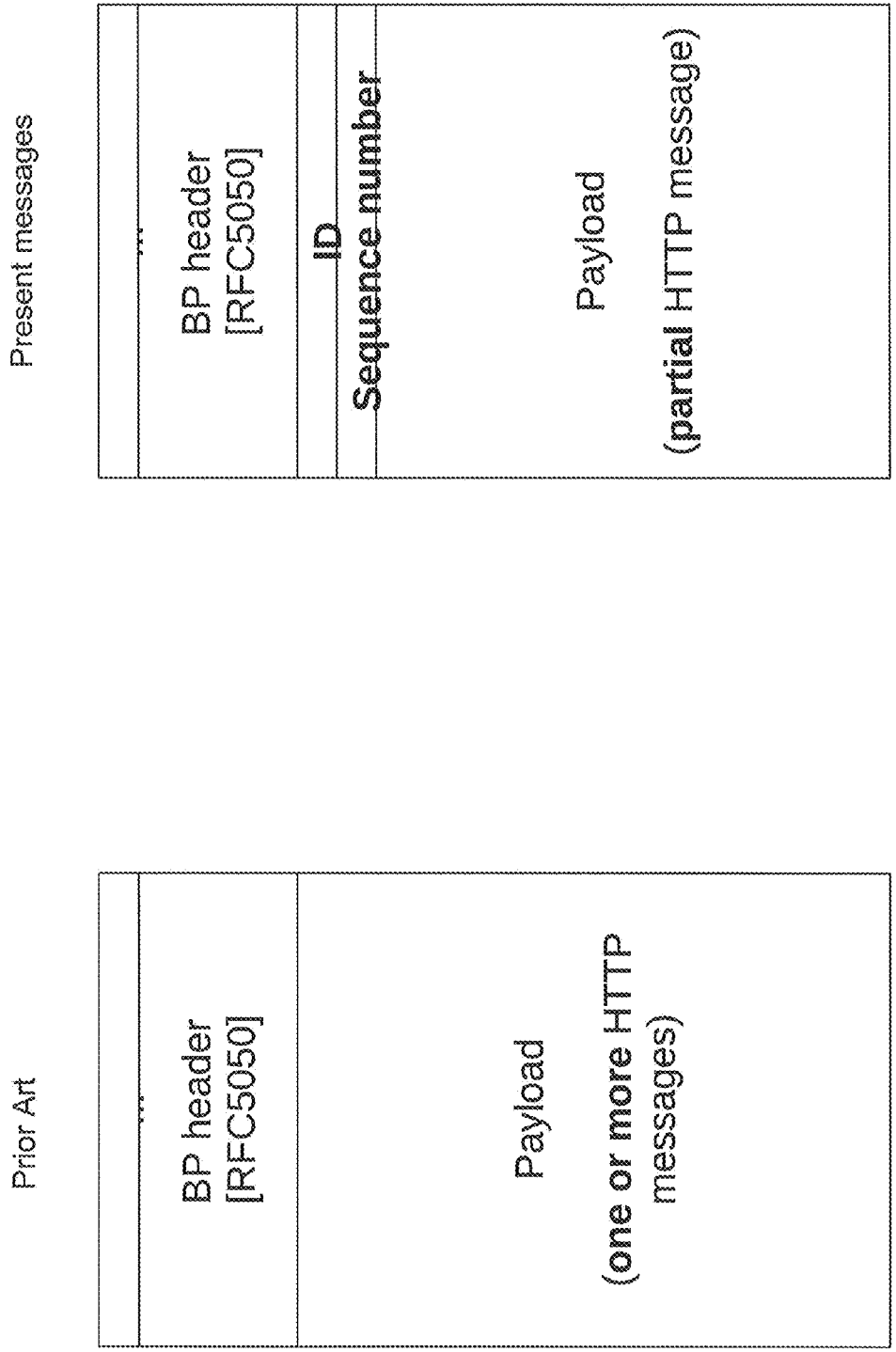
FIG. 4 is a schematic representation of HTTP responses structure as known in the prior art on the left-hand side, and corresponding to the present method and proxy shown on the right-hand side.

Reference is now made to FIG. 4, which is a schematic representation of an HTTP message structure as known in the prior art on the left-hand side, and corresponding to the present method and proxy shown on the right-hand side. The present message comprises an identifier and a corresponding sequence number. The identifier is the identifier provided to an HTTP request by a proxy acting as an entry point to a DTN network. Adding an identifier to HTTP messages to be transported over a DTN network, may be performed in a manner known in the art.

Reference is now made to FIGS. 5-8, which are exemplary signal flows for an HTTP request and HTTP responses between a client and a server, transported at some point over a DTN network, in accordance with the present method and proxy. The method starts when an HTTP client 10 generates an HTTP request. The HTTP request is received at a first proxy 12, which bundles the HTTP request, creates a bundle header comprising: a source address (the first proxy's Endpoint Identifier (EID)), a destination address (a second proxy's EID), and a unique identifier for the HTTP request. The first proxy 12 sends the bundled HTTP request to a DTN node 14 in the DTN network. The bundled HTTP request is received by the DTN node 14, which routes the bundled HTTP request to another DTN node, and eventually to a second proxy 16 (also called the destination proxy). The second proxy 16 receives the bundled HTTP request at an input and parses the bundle header of the bundled HTTP request, removes the unique identifier and stores the unique identifier in memory for further use. For example, the second proxy 16 may store the unique identifier along with the source and destination address of the bundle header, such as for example the first proxy's EID and the second proxy's EID, and/or any other information of interest. The second proxy 16 further unbundles the HTTP request message and sends the HTTP request through an output to the corresponding HTTP server 20.

The HTTP server 20 in turn provides the requested information in the payload of an HTTP response, as shown on FIG. 7. The input of the second proxy 16 receives the HTTP response from the HTTP server as multiple IP packets, and a sequencing module of the second proxy proceeds in one of the following manners: 1) prepares a partial HTTP response contained in each IP packet for being transported over the DTN network in separate bundles, or 2) prepares a partial HTTP response contained in IP packets received during a certain time period for being transported over the DTN network in a bundle, or 3) prepares a partial HTTP response contained in packets received and reaching a minimum number of bytes of payload for being transported over the DTN network in a bundle. For example, the second proxy 16 may wait for HTTP headers to be completely received, usually corresponding to 1 or 2 IP packets. The sequencing module of the second proxy 16 extracts the HTTP response length from the header: either a number of bytes, infinite, or until the end of connection. The operation of bundling partial HTTP responses is performed in any manner known in the art.

Preparing the received partial HTTP responses at the sequencing module of the second proxy 16 for transport over the DTN network includes bundling the partial HTTP responses, adding the unique identifier of the corresponding HTTP request, and adding a sequence number. The output of the second proxy then releases the bundled partial HTTP responses over the DTN network.

After transport over the DTN network, the first proxy 12 receives at an input thereof the bundles containing partial HTTP responses transported over the DTN network. The first proxy 12 debundles the received bundles containing partial HTTP responses. For doing so, a sequencing module of the proxy 12 removes from the received bundles containing partial HTTP responses the unique identifier. The sequencing module further orders the received bundles of partial HTTP responses in accordance with the sequence number in each bundle. An output of the first proxy delivers the unbundled and ordered received partial responses to the HTTP client through an IP network.

As transport aver the DTN network may be performed using different DTN nodes for subsequent bundles of partial HTTP responses, the sequence number provides a convenient way for the first proxy 12 to reorder the bundled partial HTTP responses based on the sequence number, prior to delivering the unbundled partial HTTP responses to the HTTP client 10.

The present method and proxy, by providing multiple bundles per HTTP response, thus reduce latency, eliminate the need to store full HTTP responses in the proxy, eliminate the need to bundle multiple HTTP responses together, and provide the capability to support endless streaming over DTN networks.

The present method and proxy have been described by way of preferred embodiments. It should be clear to those skilled in the art that the described preferred embodiments are for exemplary purposes only, and should not be interpreted to limit the scope of the present method and proxy. The method and proxy as described in the description of preferred embodiments can be modified without departing from the scope of the appended claims, which clearly delimit the protection sought.

The invention claimed is:

1. A method for transporting Internet Protocol (IP) packets over a Delay-Tolerant network (DTN), the method comprising:
  receiving at a proxy a request from a client;
  assigning a unique identifier to the request at the proxy;
  creating a bundle header;
  inserting the unique identifier in the bundle header;
  transporting the request with the bundle header from the proxy, over the DTN, to a peer proxy;
  receiving the request with the bundle header including the unique identifier at the peer proxy;
  storing the unique identifier at the peer proxy;
  forwarding the request from the peer proxy to a server;
  receiving at the peer proxy, from the server, a response to the request composed of multiple IP packets;
  creating at the peer proxy partial responses by bundling sub-groups of subsequent IP packets of the multiple IP packets with corresponding sequence numbers and with the unique identifier, wherein the sub-groups of subsequent IP packets are formed by (i) assembling a number of the subsequent IP packets received at the peer proxy within a predetermined time period or by (ii) assembling a number of the subsequent IP packets received at the peer proxy until a predetermined minimum payload is reached;
  transporting the partial responses from the peer proxy, over the DTN, to the proxy;
  receiving the partial responses at the proxy;
  unbundling and ordering at the proxy the received partial responses based on their respective sequence numbers; and
  delivering from the proxy the unbundled and ordered partial responses to the client.

2. The method of claim 1, wherein:
  the response is an HTTP response.

3. The method of claim 1, wherein the proxy further removes the unique identifier and the sequence number from each partial response before delivering the partial response to the client having initiated the request.

4. A system for transporting Internet Protocol (IP) packets over a Delay-Tolerant network (DTN), the system comprising:
  a proxy including:
    an input adapted to receive a request from a client;
    a sequencing module adapted to assign a unique identifier to the request, create a bundle header and insert the unique identifier in the bundle header;
    an output adapted for forward the request with the bundle header from the proxy, over the DTN; and
  a peer proxy including:
    an input adapted to receive the request with the bundle header including the unique identifier forwarded by the proxy over the DTN;
    a memory device adapted to store the unique identifier; and
    an output adapted to forward the request to a server;
  wherein the input of the peer proxy is further adapted to receive, from the server, a response to the request composed of multiple IP packets;
  wherein the peer proxy further comprises a sequencing module adapted to create partial responses by bundling sub-groups of subsequent IP packets of the multiple IP packets with corresponding sequence numbers and with the unique identifier, the sub-groups of subsequent IP packets being formed by (i) assembling a number of the subsequent IP packets received at the peer proxy within a predetermined time period or by (ii) assembling a number of the subsequent IP packets received at the peer proxy until a predetermined minimum payload is reached;
  wherein the output of the peer proxy is further adapted to forward the partial responses over the DTN to the proxy;
  wherein the input of the proxy is further adapted to receive the partial responses;
  wherein the sequencing module of the proxy is further adapted to unbundle and order the received partial responses based on their respective sequence numbers; and
  wherein the output of the proxy is further adapted to deliver the unbundled and ordered partial responses to the client.

5. The system of claim 4, wherein:
  the partial responses are HyperText Transfer Protocol (HTTP) messages.

6. The system of claim 4, wherein the received response comprises HTTP streaming.

7. A proxy for delivering and forwarding Internet Protocol (IP) packets over a Delay-Tolerant network (DTN), the proxy comprising:
  a first input adapted to receive a request from a client;
  a first sequencing module adapted to assign a unique identifier to the request, create a bundle header and insert the unique identifier in the bundle header;
  a first output adapted for forward the request with the bundle header over the DTN to a peer proxy;
  a second input adapted to receive a similar request including a similar bundle header and a similar unique identifier forwarded by the peer proxy over the DTN;
  a memory device adapted to store the similar unique identifier received in the similar request; and
  a second output adapted to forward the similar request to a server;
  wherein:
  the second input is further adapted to receive, from the server, a response to the similar request composed of multiple IP packets;
  the proxy further comprises a second sequencing module adapted to create partial responses by bundling sub-groups of subsequent IP packets of the multiple IP packets with corresponding sequence numbers and with the similar unique identifier received in the similar request, the sub-groups of subsequent IP packets being formed by (i) assembling a number of the subsequent IP packets received at the proxy within a predetermined time period or by (ii) assembling a number of the subsequent IP packets received at the proxy until a predetermined minimum payload is reached;
  the second output of is further adapted to forward the partial responses over the DTN to the peer proxy;
  the first input is further adapted to receive similar partial responses from the peer proxy;
  the first sequencing module is further adapted to unbundle and order the received similar partial responses based on respective sequence numbers;
  the first output is further adapted to deliver the unbundled and ordered similar partial responses to the client.

8. The proxy of claim 7, wherein:
the partial responses are HyperText Transfer Protocol (HTTP) messages; and
the request is an HTTP request.

* * * * *